United States Patent Office 2,918,375
Patented Dec. 22, 1959

2,918,375
ALGIN GEL COMPOSITIONS AND METHOD

Kenneth F. Gibsen, San Diego, Calif., assignor to Kelco Company, San Diego, Calif., a corporation of Delaware No Drawing. Application July 27, 1956
Serial No. 600,377

20 Claims. (Cl. 99—131)

This invention relates to aqueous gelatinous products produced from water soluble alginates by the interaction of said alginates with certain salts, particularly salts of calcium, and in the presence of fumaric or adipic acid.

It is an object of this invention to provide new aqueous algin gel compositions and methods of producing said compositions.

The invention is suitable for use either in the hot or cold way for producing a wide variety of edible products such as fruit jams and jellies, jellied salads and broths, water jelly desserts and candy jellies. Inedible jellies may also be made for inductrial purposes, such as gels for dental impressions, deodorants, insecticides, and the like.

The instant invention is particularly suitable for producing cold water dessert gels.

It is a further object of this invention to produce clear, smooth, firm yet tender cold water dessert gels.

It is still another object of this invention to produce one step, instant-type cold water dessert gels.

It is still another object of the invention to produce gel forming compositions that are relatively non-hygroscopic and suitable for packaging in small household size packages.

It is a still further object of the invention to produce cold water dessert gels that are relatively stable on storage in household refrigerators.

It is still another object of this invention to produce cold water dessert gels that do not become rubbery in texture on storage or strongly acidic in taste.

In accordance with my invention, I have found that I can accomplish one or more of the foregoing objectives, and in particular produce a highly desirable, edible, cold water dessert gel, with the products and method hereinafter described.

In general, my method comprises adding a water soluble alginate, a salt such as a calcium salt whose cations form a water-insoluble salt with alginic acid, an alkali metal salt of a weak acid, and fumaric or adipic acid, to an aqueous medium such as cold water to produce a gel composition. The materials and methods which I employ are more particularly set forth below.

(1) A water-soluble algin. This may be the alginate of ammonium, magnesium, potassium, sodium or other alkali metal, or the alginate of an organic base such as mono-, di- or tri-ethanolamine, aniline, etc. These soluble algins may be prepared by well known methods such as disclosed in the following United States patents: 1,814,981, Thornley and Walsh, July 14, 1931; 2,036,922, Clark and Green, April 7, 1936; 2,036,934, Green, April 7, 1936; and 2,128,551, Le Gloahec, August 30, 1938.

The viscosity of the algin is not critical, though the higher viscosity algins form stronger gels than those of lower viscosity. As the compositions are usually prepared in the dry form, the algin is comminuted. The most favorable grain size depends on the usage of the composition. An especially preferred water soluble alginate for my purpose is a commercial grade of fibrous sodium alginate sold by the Kelco Company, San Diego.

The best gels for clarity and smoothness are obtained if the calcium ash of the sodium alginate is low, i.e., about 0.5% or less expressed as calcium oxide ash.

(2) A salt, preferably of calcium, which either is insoluble or very slightly soluble in water, or which in aqueous solution is only slightly ionized, or both, and which on the addition of an acid yields cations which gelatinize alginates. This might otherwise be defined as an algin-gelatinizing salt having a low solubility product. In still other words, the salt in an aqueous medium must not yield any material number of the cations which gelatinize the alginic component until the acid reacts with the salt.

Examples are tricalcium phosphate, dicalcium phosphate, calcium carbonate, and calcium tartrate. Salts of the other alkali-earth metals (with the exception of magnesium, which forms water-soluble alginates) may be substituted for the calcium salts. Many of the heavy metals may be substituted for calcium, but not as a rule in edible compositions as most of these metals are more or less toxic.

In producing cold water dessert gels, I have found that dicalcium phosphate and tricalcium phosphate are particularly suitable sources of cations for said purpose. In most cases it will be desirable to use less than the stoichiometric equivalent of calcium or other gel-forming salt. The use of such quantities of said salts tends to produce clearer gels.

It will be understood that in the above remarks the reference to calcium salts is intended to be illustrative only. The same principles apply in the use of the corresponding salts of the other alkali-earth metals and of the heavy metals.

The term "a salt whose cations . . . are no more than slightly liberated in water" is intended to cover the type of salt above described, having a low solubility product. The desired effect of restricting the presence of free calcium or similar cations to the lowest possible terms may be realized through low solubility, or low ionizability, or more often through both of these characteristics. It is conceivable, however, that a substance might be completely ionized in water and yet furnish only a negligible number of cations, due to its extremely low solubility. On the other hand, a much more soluble substance might yield the same negligible number of cations by reason of its low inherent ionizability. It is preferred to use a substance for this purpose which has a solubility product not higher than $10^{-4}$ at 25° C. In most cases it will be desirable to use less than the stoichiometric equivalent of calcium or other gel-forming salt. The use of such quantities of the said salts tends to produce clearer gels.

(3) In addition to the ingredients mentioned in (1) and (2) in the foregoing, I also employ a gel-inhibiting or gel-retarding salt. This component may be one of the alkali metal salts of such acids as citric and the various phosphoric acids. These tend to inhibit gel formation by reason of their buffer action, and alkalinity, their common ion effect or combination of these effects. In general, these inhibitors are salts of weak acids. A particularly suitable material for this purpose is sodium hexametaphosphate. This phosphate is sold commercially under the trade name Calgon. The amount of retarder such as Calgon to be used will vary depending not only on the algin and acid, i.e., fumaric or adipic, employed, but also on the nature of the aqueous medium.

(4) In producing aqueous gels in accordance with my invention, in addition to the alginates as described in (1) above, the calcium salts described in (2) above, and the gel retarder described in (3), I employ either fumaric or adipic acid, and of said acids I prefer fumaric in that it is non-hygroscopic and in addition smaller amounts are required than when using adipic acid. Both of these are available commercially.

On the solution of either fumaric or adipic acid, the calcium salt is ionized to yield calcium ions, these free ions immediately reacting with the soluble alginates to form insoluble calcium alginate. It will be appreciated that inasmuch as fumaric is a stronger acid than adipic, the speed of the reaction will not only depend on the salt employed but also upon the amount and nature of the acid. In general, it will be appreciated that the fumaric or adipic acid is used in a quantity sufficient to liberate the calcium to react with the soluble alginate to form the insoluble calcium alginate. In addition, the said quantity of acid will give an acidic taste to the resulting gel.

In keeping with my invention it is my purpose to produce a combination of ingredients that can be added in one step to produce a cold water dessert gel. Thus, I prefer to premix all of the ingredients, i.e., the water soluble alginate, the salt used as a source of cations, the retarder such as Calgon, and the fumaric or adipic acid.

The usual source of cold water for making dessert gels is tap water and, depending upon the locality, the mineral content of such water will vary. Thus, adjustments in the quantities of the materials making up my 4-component composition are contemplated as required in aqueous medium of varying degrees of mineral content. The components making up my composition render themselves to blending and pre-packaging prior to use. It will be understood, however, that if it should be desired, the ingredients could be added separately to an aqueous liquid to produce a gel therefrom.

The following are examples of my invention showing the use thereof in the manufacture of cold water dessert gels from San Diego tap water.

*Example 1*

Sugar _____gms__ 100
Sodium alginate, fibrous _____gms__ 4
Sodium hexametaphosphate (Calgon) _____gms__ 3
Tricalcium phosphate _____gm__ 1
Fumaric acid _____gms__ 2
Color and flavor _____ To suit
Water _____ 1 pint The above ingredients were mixed dry and added to cold water (San Diego tap water) in a mixing bowl and mixed for three minutes, by beating, with an edible gel forming in about 10 minutes after pouring. The resulting gel did not harden excessively and become rubbery or become strongly acidic in taste even after standing 24 hours. The resulting gel had a pH of 3.6.

*Example 2*

Sugar _____gms__ 100
Sodium alginate, fibrous _____gms__ 4
Sodium hexametaphosphate (Calgon) _____gms__ 1½
Tricalcium phosphate _____gm__ 1
Adipic acid _____gms__ 4
Color and flavor _____ To suit
Water _____ 1 pint The above ingredients were mixed dry and added to cold water (San Diego tap water) in a mixing bowl and mixed for three minutes, by beating, with an edible gel forming in about 10 minutes after pouring. The resulting gel did not harden excessively and become rubbery or become strongly acidic in taste even after standing 24 hours. The resulting gel had a pH of 4.0.

My experience has demonstrated that the time of setting can be varied by increasing or reducing the calcium phosphate, hexametaphosphate, fumaric acid or adipic acid. The best gels are obtained if the ingredients are used with the 3 to 5 minute mixing period with gel formation in no less than 10 minutes additional time. Warm water increases the gelling time. However, boiling water can be used if the quantity of Calgon is reduced or the calcium salt is increased.

*Example 3*

The following are formulations that were found to produce suitable cold water dessert gels with 2 cups of cold San Diego tap water. The pH of these gels was in the range of 3.5 to 4.0.

|  | 1 | 2 | 3 | 4 |
|---|---|---|---|---|
| Potassium Alginate (low ash) | 4.0 | 4.0 | 4.0 | 4.0 |
| Calgon | 3.0 | 3.0 | 1.25 | 1.0 |
| Fumaric Acid | 2.0 | 2.0 | | |
| Adipic Acid | | | 3.5 | 3.5 |
| Tricalcium Phosphate | 0.75 | | 0.5 | |
| Dicalcium Phosphate | | | | 0.5 |
| Calcium Carbonate | | 0.70 | | |
| Sugar | 75 | 75 | 75 | 75 |
| Flavor and Color | As desired | | | |

*Example 4*

The following is an example of another formulation that I have used that gave a clear, smooth, firm, tender dessert gel from cold San Diego tap water.

Gms.
Water soluble sodium alginate _____ 3.8
Anhydrous dicalcium phosphate (Victor) _____ 0.5
Sodium hexametaphosphate (Calgon) _____ 1
Powdered fumaric acid (80 mesh) _____ 1
Dessert sugar _____ 65

It will be appreciated that the foregoing examples are merely illustrative of my invention and that many formulations can be made in accordance with my invention as disclosed herein and as claimed in the appended claims.

I claim:

1. A product suitable for producing an aqueous dessert gel comprising a water soluble alginate, a salt whose cations from a water-insoluble salt with alginic acid, an alkali metal salt of a weak acid, and dibasic acid of very low water solubility selected from the group consisting of adipic acid and fumaric acid.

2. A product suitable for producing an aqueous dessert gel comprising a water soluble alginate, a salt whose cations form a water-insoluble salt alginic acid, an alkali metal salt of a weak acid, and fumaric acid.

3. A product suitable for producing an aqueous dessert gel comprising a water soluble alginate, a salt whose cations form a water-insoluble salt with alginic acid, an alkali metal salt of a weak acid, and adipic acid.

4. A product suitable for producing cold water acidic gels from an aqueous medium containing calcium and phosphate ions comprising a water soluble alginate and a dibasic acid having a very low water solubility selected from the group consisting of adipic acid and fumaric acid.

5. A product suitable for producing cold water acidic gels from an aqueous medium containing calcium and phosphate ions comprising a water soluble alginate and fumaric acid.

6. A product suitable for producing cold water acidic gels from an aqueous medium containing calcium and phosphate ions comprising a water soluble alginate and adipic acid.

7. The method of gelatinizing an aqueous liquid which comprises: introducing into said liquid a water soluble salt of alginic acid, a salt whose cations form a water-insoluble salt with alginic acid, and which has a solubility product not substantially exceeding $10^{-4}$ at 25° C. and an acid selected from the group consisting of fumaric and adipic acids.

8. The method of gelatinizing an aqueous liquid which comprises: introducing into said liquid a water soluble salt of alginic acid, a salt whose cations form a water-insoluble salt with alginic acid, and which has a solubility product not substantially exceeding 10⁻⁴ at 25° C. and fumaric acid.

9. The method of gelatinizing an aqueous liquid which comprises: introducing into said liquid a water soluble salt of alginic acid, a salt whose cations form a water-insoluble salt with alginic acid, and which has a solubility product not substantially exceeding $10^{-4}$ at 25° C. and adipic acid.

10. The method of gelatinizing an aqueous liquid which comprises: introducing into said liquid a water soluble salt of alginic acid, a salt whose cations form a water-insoluble salt with alginic acid, an alkali metal salt of a weak acid, and an acid selected from the group consisting of fumaric and adipic acids.

11. The method of gelatinizing an aqueous liquid which comprises: introducing into said liquid a water soluble salt of alginic acid, a salt whose cations form a water-insoluble salt with alginic acid, an alkali metal salt of a weak acid, and fumaric acid.

12. The method of gelatinizing an aqueous liquid which comprises: introducing into said liquid a water soluble salt of alginic acid, a salt whose cations form a water-insoluble salt with alginic acid, an alkali metal salt of a weak acid, and adipic acid.

13. A method substantially as set forth in claim 10 in which said salt of alginic acid is sodium alginate.

14. A method of producing a cold water dessert gel comprising admixing the following materials in approximately the amounts set forth for each pint of water employed:

| | Gms. |
|---|---|
| Sodium alginate | 4 |
| Sodium hexametaphosphate | 3 |
| Fumaric acid | 2 |
| Tricalcium phosphate | .75 |

15. A method of producing a cold water dessert gel comprising admixing the following materials in approximately the amounts set forth for each pint of water employed:

| | Gms. |
|---|---|
| Sodium alginate | 4 |
| Sodium hexametaphosphate | 3 |
| Fumaric acid | 2 |
| Calcium carbonate | .70 |

16. A method of producing a cold water dessert gel comprising admixing the following materials in approximately the amounts set forth for each pint of water employed:

| | Gms. |
|---|---|
| Sodium alginate | 4 |
| Sodium hexametaphosphate | 1.25 |
| Adipic acid | 3.5 |
| Tricalcium phosphate | .5 |

17. A method of producing a cold water dessert gel comprising admixing the following materials in approximately the amounts set forth for each pint of water employed:

| | Gms. |
|---|---|
| Sodium alginate | 4 |
| Sodium hexametaphosphate | 1.25 |
| Adipic acid | 3.5 |
| Dicalcium phosphate | .5 |

18. A new and useful cold water dessert gel comprising approximately the following amounts of materials for each pint of water contained therein:

| | Gms. |
|---|---|
| Sugar | 100 |
| Sodium alginate | 4 |
| Sodium hexametaphosphate | 3 |
| Tricalcium phosphate | 1 |
| Fumaric acid | 2 |

19. An edible jelly comprising the product resulting from the reaction with approximately 100 to 200 parts by weight of water of a dry mixture containing approximately 0.5 to 2.0 parts by weight of a water-soluble salt of alginic acid, approximately 0.075 to 0.35 part by weight of a relatively insoluble edible calcium salt, approximately 0.05 to 1.0 part by weight of an alkali metal salt of a molecularly dehydrated phosphoric acid, and from approximately 0.5 to 1.2 parts by weight of an edible organic acid selected from the class consisting of fumaric acid and adipic acid.

20. In the method of producing a cold water dessert gel by gelatinizing an aqueous liquid wherein the gel comprises a water-soluble alginate, a salt whose cations form a water-insoluble salt with alginic acid, an alkali metal salt of a weak acid, and an organic acid of very low solubility in water, the improvement which comprises employing as the said organic acid of very low solubility in water an organic acid selected from the group consisting of adipic acid and fumaric acid.

References Cited in the file of this patent
UNITED STATES PATENTS

| 2,441,729 | Steiner | May 18, 1948 |
| 2,609,298 | Kirby | Sept. 2, 1952 |
| 2,698,803 | Common et al. | Jan. 4, 1955 |

UNITED STATES PATENT OFFICE

CERTIFICATE OF CORRECTION

Patent No. 2,918,375                                                    December 22, 1959

Kenneth F. Gibsen

It is hereby certified that error appears in the printed specification of the above numbered patent requiring correction and that the said Letters Patent should read as corrected below.

Column 4, line 38, for "from" read — form —; line 44, after "salt" insert — with —.

Signed and sealed this 24th day of May 1960.

(SEAL)
Attest:

KARL H. AXLINE                                                   ROBERT C. WATSON
Attesting Officer                                              Commissioner of Patents